Figure 1:
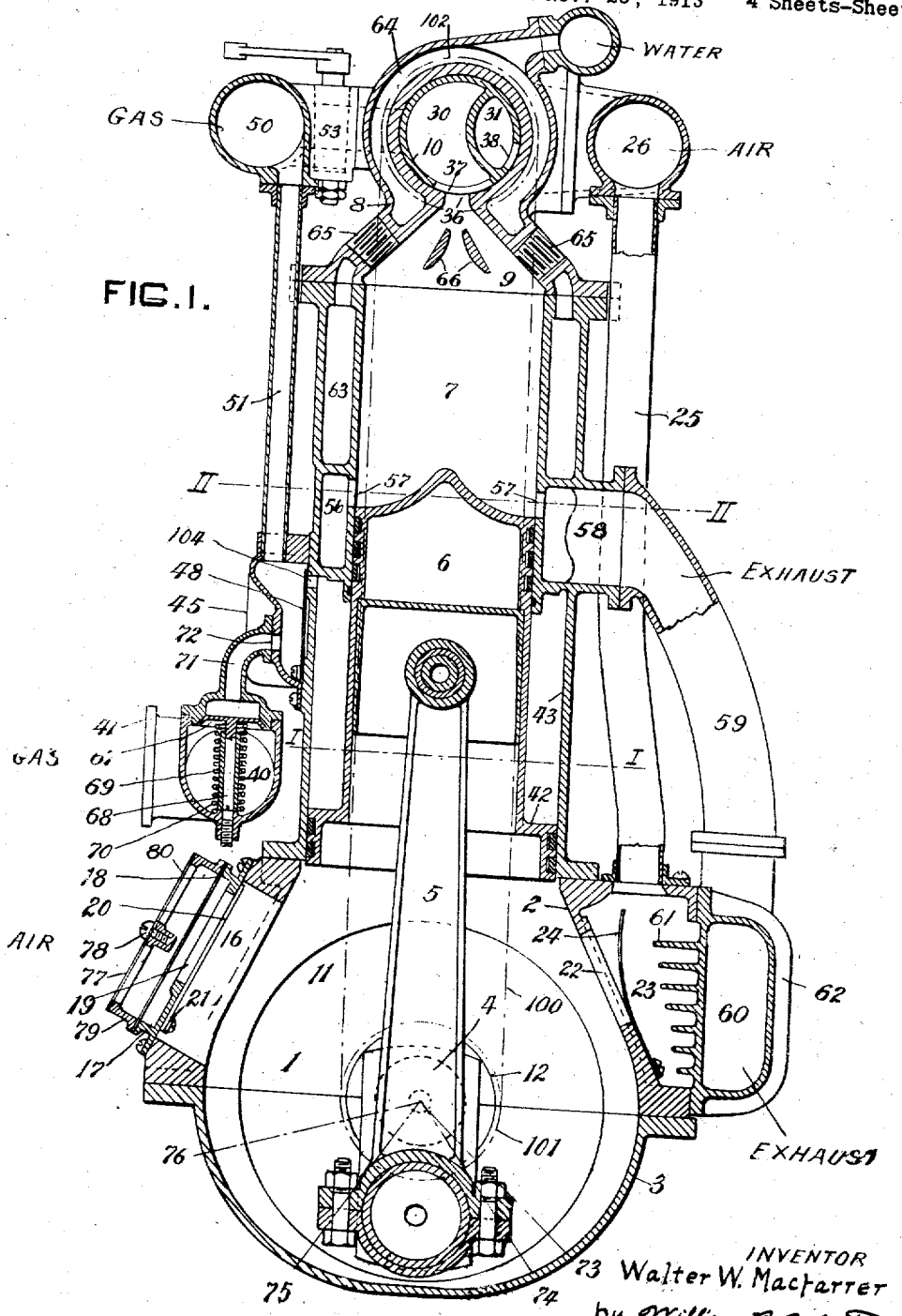

May 12, 1925.

W. W. MACFARREN

Re. 16,069

INTERNAL COMBUSTION ENGINE

Original Filed Nov. 26, 1913 4 Sheets-Sheet 1

INVENTOR
Walter W. Macfarren
by William B. Wharton
his attorney

May 12, 1925. Re. 16,069

W. W. MACFARREN

INTERNAL COMBUSTION ENGINE

Original Filed Nov. 26, 1913 4 Sheets-Sheet 2

INVENTOR

Walter W. Macfarren by William B. Wharton his attorney

May 12, 1925. Re. 16,069

W. W. MACFARREN

INTERNAL COMBUSTION ENGINE

Original Filed Nov. 26, 1913 4 Sheets-Sheet 3

INVENTOR

Walter W. Macfarren by William B. Wharton his attorney

May 12, 1925. Re. 16,069

W. W. MACFARREN

INTERNAL COMBUSTION ENGINE

Original Filed Nov. 26, 1913 4 Sheets-Sheet 4

INVENTOR
Walter W. Macfarren
by William B. Wharton
his attorney

Reissued May 12, 1925. Re. 16,069

UNITED STATES PATENT OFFICE.

WALTER W. MACFARREN, OF PITTSBURGH, PENNSYLVANIA.

INTERNAL-COMBUSTION ENGINE.

Original No. 1,325,305, dated December 16, 1919, Serial No. 803,185, filed November 26, 1913. Application for reissue filed March 30, 1923. Serial No. 628,869.

*To all whom it may concern:*

Be it known that I, WALTER W. MACFARREN, a citizen of the United States, residing at Pittsburgh, in the county of Allegheny and State of Pennsylvania, have invented certain new and useful Improvements in Internal-Combustion Engines, of which the following is a specification.

My invention relates to internal combustion engines and more particularly to those of the multicylinder type as used on automobiles.

The objects of my invention are:

1. To provide large port areas, particularly for the exhaust.

2. To provide means for compressing air to scavenge the cylinder and for combustion.

3. To expand the air charge by heating the same prior to its entering the cylinder.

4. To provide means for introducing the scavenging air at the end of the cylinder opposite the exhaust ports, so that the flow of the exhaust gases and the flow of the air will be in the same direction.

5. To open the exhaust ports before opening the air ports so the exhaust pressure may drop below that of the air.

6. To introduce a charge of rich gas or vapor after the introduction of the scavenging air.

7. To close the exhaust ports before introducing the gas.

8. To provide an auxiliary reservoir of gas close to the cylinder and quick opening gas ports so that the gas may be rapidly introduced to the cylinder.

9. To provide an excess of scavenging air to assist in cooling the cylinder.

10. To inclose practically all the working parts.

11. To provide an engine in which variations in the quality of the fuel are readily compensated for.

12. To provide separate means for compressing the gas and air.

13. To provide a main reservoir to contain gas under pressure in readiness for use.

14. To provide automatic means for maintaining a constant pressure in the main reservoir.

15. To provide both inlet and discharge valves for the crank cases.

16. To provide an air manifold connecting all the crank cases and a single air passage leading therefrom to the cylinders.

17. To provide means for supplying the cylinder with a charge of gas and air at a pressure above the atmosphere whereby a larger charge is available.

18. To provide means for heating the air charge from the exhaust.

19. To provide a rotary valve for the gas and air in the cylinder head.

20. To form the combustion space in the cylinder head.

21. To offset the combustion spaces so as to obtain longer ports.

22. To provide hand hole plates in the crank case and to mount the inlet air valves thereon.

23. To provide two gas throttles each controlling the supply of fuel to half the cylinders.

24. To provide separate compartments in the rotary valve for the air and gas.

25. To make the combustion space in the form of a wedge with the inlet port at the small end thereof.

26. To provide deflectors to spread the entering charge.

27. To provide means whereby at loads from one-half load to full load all the cylinders are operated with a constant air charge and variable gas charge; at loads between one-half and one quarter load half the cylinders are operated in the same manner, and at loads less than one quarter load half the cylinders are operated with a variable air and variable gas charge.

28. And to provide a simple and durable engine which will be economical of fuel.

Figures 2, 3:
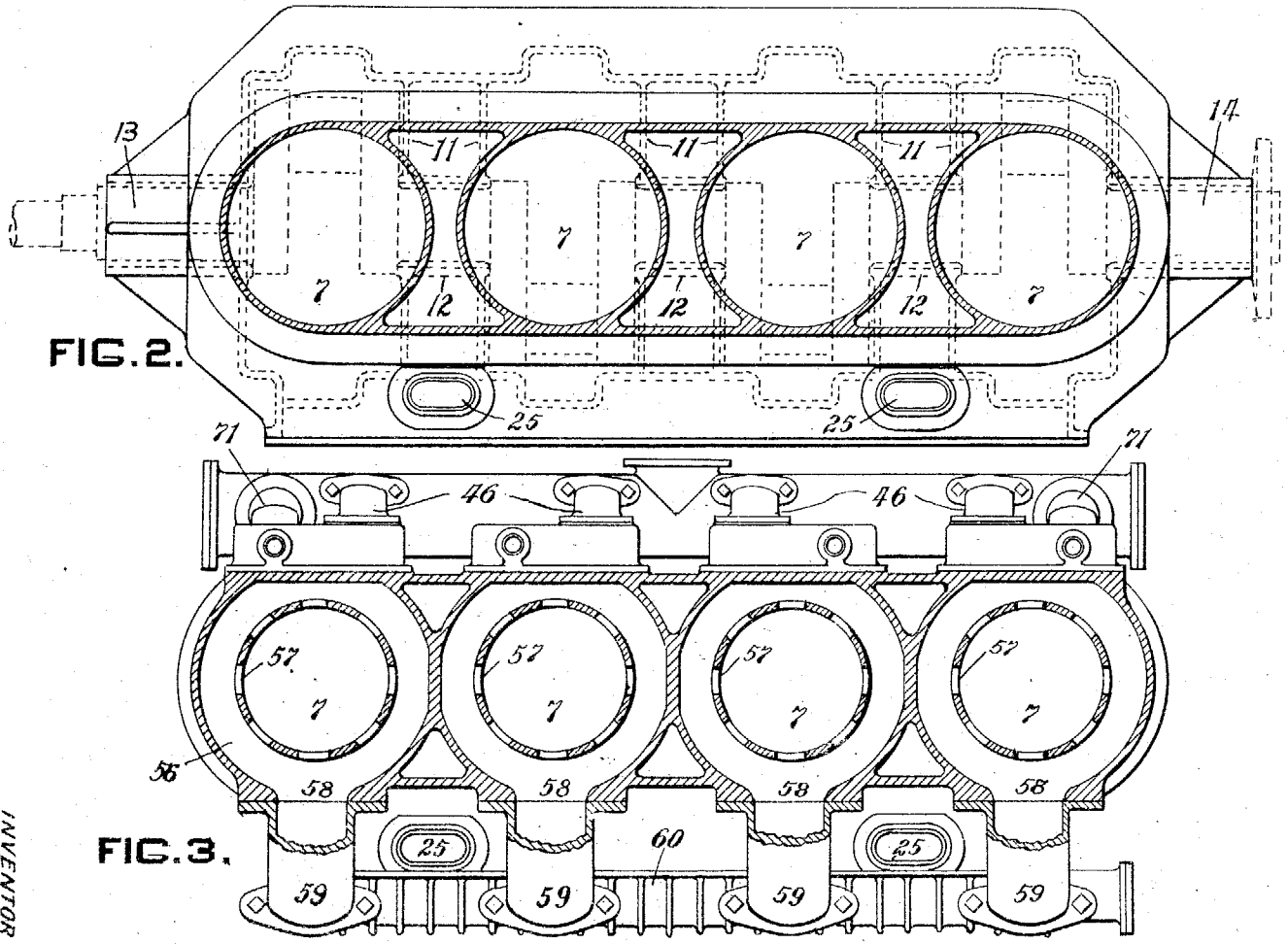
Figure 4:
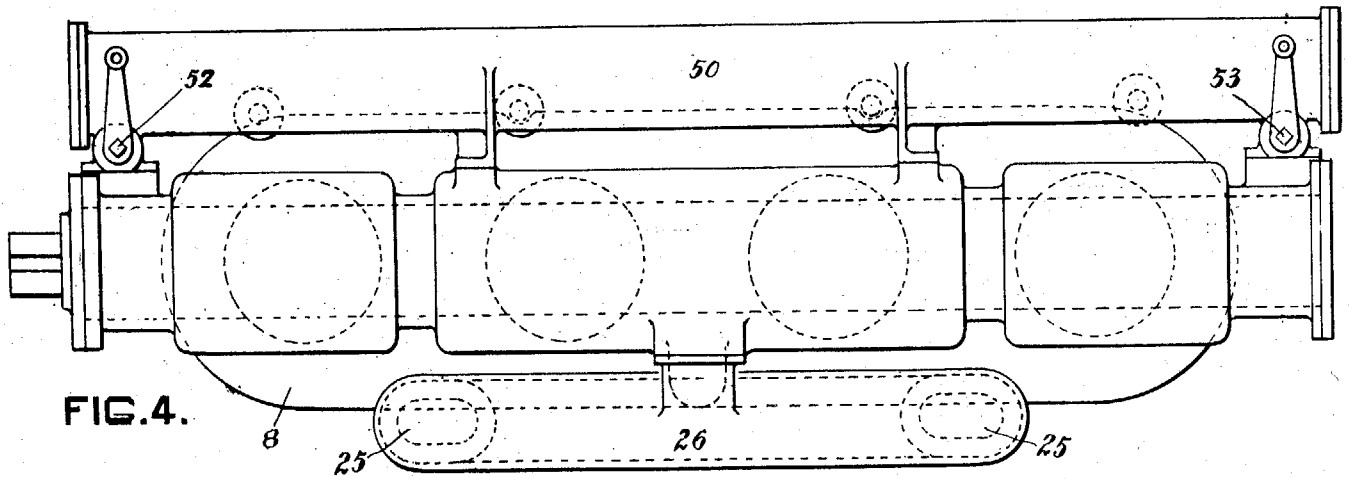
Figure 6:
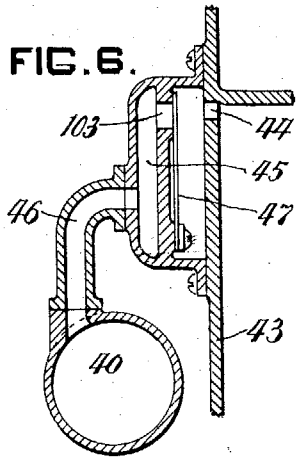
Figure 7:
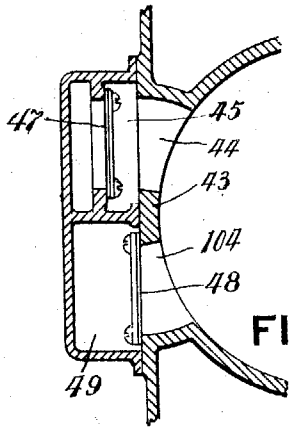
Figure 8:
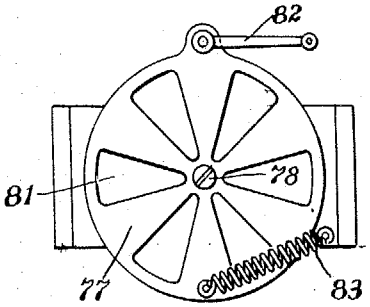
Figure 5:
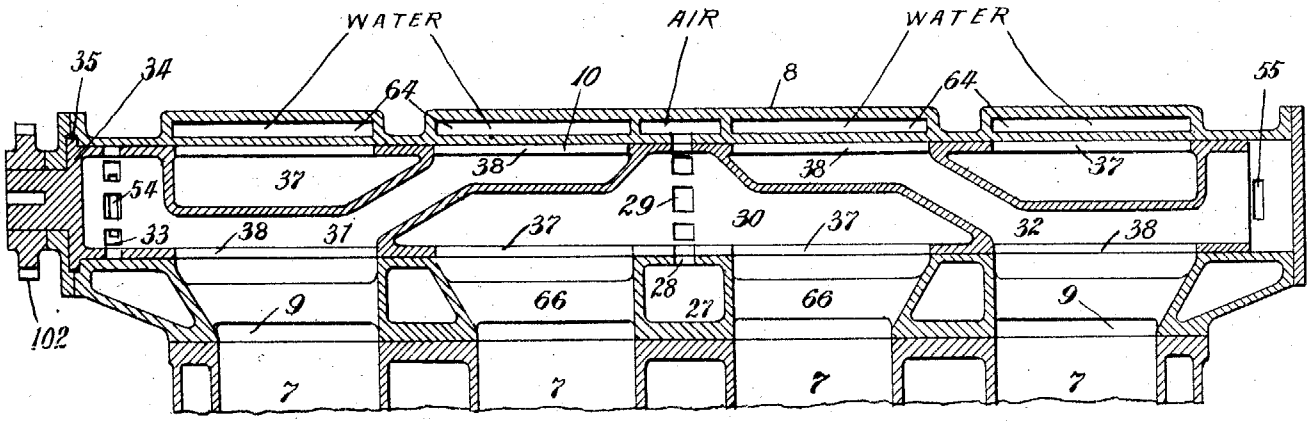
Figure 9:
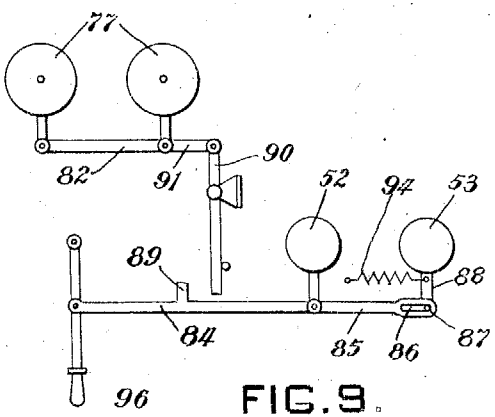

Referring to the drawings, Figure 1 is a sectional elevation of my engine, Fig. 2 is a sectional plan on the line I—I of Fig. 1. Fig. 3 is a sectional plan on the line II—II of Fig. 1, Fig. 4 is a plan view of the same, Fig. 5 is a diagrammatic vertical section through the rotary valve, Fig. 6 is a sectional elevation through the inlet valve for the gas pump, Fig. 7 is a sectional plan of the valve chamber for the gas pump, Fig. 8 is an elevation of the supplementary air shutter, and Fig. 9 is a diagram of mechanism for operating the same.

My engine is provided with a crank case 1 formed in upper and lower halves 2 and 3; a crank shaft 4, connecting rods 5, pistons 6, cylinders 7, and a cylinder head 8 containing the combustion spaces 9 and the rotary valve 10.

The crank case 1 is provided with transverse walls 11 forming individual compartments for each of the cylinders and a shaft bearing 12 is formed between each pair of cylinders. Longer bearings 13 and 14 are formed at the ends of the crankcase.

A series of hand holes 16 are formed in the upper half 2 of the crankcase, one of these opening into each of the said compartments. The openings 16 are provided with covers 17 each having a screen 18, air inlet ports 19 and a sheet metal valve 20 one end of which is secured to the cover 17 by a clamp 21, the other end being free to spring open to admit the air. These valves are preferably made of very thin spring steel, and are so adjusted that they close lightly by their own tension.

On the up stroke of the pistons 6 air enters the several compartments of the crank case 1 through the valves 20. Each compartment is further provided with discharge ports 22 leading into an air manifold 23. There are several narrow parallel ports 22 for each compartment of the crankcase, and a discharge valve 24 which may be a duplicate of the valves 20 covers the ports 22.

On the down stroke of the piston 6 the air is discharged from the several compartments into the common manifold 23 in which pressure is constantly maintained although this pressure varies somewhat as will appear later.

From the manifold 23 the air passes up through a pair of pipes 25 (one pipe 25 would be enough—two are used as a matter of convenience) which lead into a horizontal pipe or manifold 26. The manifold 26 connects with a chamber 27 in the cylinder head 8 which surrounds the rotary valve 10. See Fig. 5. A ring port 28 in the chamber 27 surrounds a number of ports 29 cut through the wall of the hollow valve 10 through which the air enters the air compartment 30 of the valve.

The interior of the valve 10 is divided into an air compartment 30 and two gas compartments 31 and 32.

The air compartment 30 may be said to comprise the whole interior of the valve and the gas compartments 31 and 32 are formed within the same. In a one or two cylinder motor only one gas compartment would be required, the purpose of subdividing the gas compartments being the facility thus afforded for controlling the motor by groups of cylinders as fuel may be fed to either or both compartments.

Gas enters the compartment 31 through a ring of ports 33 in the valve 10 and gas enters the compartment 32 through the open end of the valve 10. In case however it is desired to drive a magneto or other accessory from this end of the valve, ports similar to ports 33 may be used.

The valve 10 is provided with a collar 34 working in a recess 35 to prevent end play and may be driven by any desired means from the crank shaft 4, a sprocket chain 100 and sprockets 101 and 102 being shown for this purpose.

A combustion space or clearance 9 is provided in the cylinder head 8 for each cylinder 7. The spaces 9 are circular where they join the cylinder bore and terminate in a long, narrow inlet port 36 at the top; their general contour may be described as a wedge with a circular base. The inlet ports 36 are longer than the cylinder bore so as to obtain sufficient area in a narrow quick opening port. The valve 10 is provided with an air port 37 leading out of the compartment 30 and a gas port 38 leading out of the compartment 31 for each cylinder, the air port 37 being wider than the gas port 38 as shown in Fig. 1.

An inlet gas manifold 40 extends along one side of the motor and has a flange 41 for the carbureter (not shown). The lower end of the piston 6 has an enlarged end forming the gas piston 42 which works in the enlarged lower end 43 of the cylinder 7. A port 44 cut through the wall of the cylinder 43 connects with a valve chamber 45 from which a pipe 46 leads to the interior of the inlet manifold 40.

On the down stroke the piston 42 draws in gas through the port 103 controlled by the flat spring valve 47, and on the up stroke this gas is forced through a port 104 past a similar spring valve 48 in the valve chamber 49 from which a pipe 51 conducts the gas to a pressure manifold 50. It will be understood that the valves 47 and 48 and the pipe 51 are duplicated for each cylinder of the motor, and the valve chambers 45 and 49 are conveniently made in one casting.

From the pressure manifold 50 the gas passes normally through a pair of plug valves 52 and 53 into ports 54 and 55, the port 54 supplying the compartment 31 in the valve 10 and the port 55 supplying the compartment 32 therein.

Each cylinder 7 is surrounded by an exhaust passage 56 from which a ring of ports 57 communicate with the interior of the cylinder. Exhaust passages 58 connect passages 56 with pipes 59 leading to the exhaust manifold 60. The manifold 60 forms a cover for the air manifold 23 and is provided with longitudinal ribs 61 which extend into the air manifold 23 and heat the scavenging air charge after it has passed the valves 24, thus reducing the power required to pump the air by increasing the volume of the same, and thus decreasing the volume which must be pumped. Heat radiating ribs 62 are also provided on the manifold 60.

The cylinders 7 are provided with water jackets 63 which communicate with water jackets 64 around the valve 10. Holes for spark plugs are shown at 65. Just inside the port 36 a pair of deflectors 66 are placed to break up and distribute the air charge to insure even scavenging of the cylinder.

The throttle on the carbureter may be permanently set to allow that amount of gas to pass which will supply the motor with maximum charges at maximum speed, and with gas cocks 52 and 53 wide open. When the gas cocks (either or both) are partly or wholly closed the pressure in gas manifold 50 would rise unduly unless means are provided to relieve the pressure. This is conveniently done by one or more by-pass valves 67 (two are shown). These valves have stems 68 mounted in guides 69 cast in the interior of the inlet manifold 40 and are seated by springs 70 against the bottom of special elbows 71 which connect with openings 72 leading into two of the gas discharge valve chambers 49. These valves act as regulating valves to maintain a constant pressure in manifold 50. When a rise of pressure occurs the valves 67 open and allow the gas to flow back into the inlet manifold 40 through pipes 51 and elbows 71.

The operation of my improved motor is as follows: Air is pumped from all the crank cases to the air compartment 30 of the valve 10. This compartment is of considerable volume and acts as a reservoir of air and as the passage from the interior of the valve to the clearance space 9 is very short the air is introduced into the cylinder with extreme rapidity which would not be the case if each individual piston compressed the air for its own cylinder, and the air was required to travel at each stroke from the crank case to the cylinder.

It will be noted that the time during which the air port 37 is opened varies with the speed of the motor, and that the quantity of air which passes through this port depends both on the interval of opening and on the pressure of the air.

At low speeds the ports 37 being open longer, all the air pumped from the crank case will have ample time to pass through so that the pressure in manifold 23, air compartment 30 and the connecting pipes 25 and 26 will drop to the lowest point. When the motor speeds up, however, less time will be available for the air to pass out of the valve 10 through ports 37, and as less air will therefore pass out the pressure will rise somewhat. This will increase the velocity of the air passing out of the valve and consequently the pressure in the manifold 23 will vary somewhat with the speed.

The gas is likewise quickly introduced from the gas compartment.

When the crank reaches the position shown at 73 the exhaust ports 57 commence to open, and when the crank has reached position 74 the ports 57 are open about ¼″. At this position the pressure in the cylinder 7 has dropped to atmosphere or nearly so, and the air port 37 in the valve 10 opens communication with the cylinder port 36 allowing the air in compartment 30 to flow in and sweep out the burnt gases.

The rotary valve 10 is driven at the same speed as the crank shaft 4 and when the crank is in the position shown at 75 the exhaust ports 57 close, the air port 37 closes and the gas port 38 begins to open. The port 38 remains open until position 76 is reached.

It will be noted that the gas port 38 does not open until the exhaust ports 57 are entirely closed and that the gas is introduced during the beginning of compression.

It is, therefore, necessary to precompress the gas to a slightly higher pressure than usual in two cycle engines, but the power required to do this is compensated for by the certainty that no gas can be lost through the exhaust ports, and further by the fact that a denser charge is introduced thus producing more power in the same size cylinder.

It is to be further noted that when using gasolene or other liquid fuel the gas handled by the gas pump and sent into the valve 10 is not an inflammable mixture but an over-rich mixture requiring further dilution with air before burning.

The cylinders are arranged in pairs, the forward pair having cranks at 180°, and the rearward pair also having cranks at 180°, and the two pairs of cranks may either be arranged in one plane or at 90° to each other depending on whether evenness of torque or accurate balance is most desirable. By the use of separate gas compartments 31 and 32 in the valve 10 and separate throttle valves 52 and 53 either group of cylinders may be operated independently of the other and thus the number of cylinders working may be determined by the load on the motor. By this means much fuel can be saved at half load or less by operating two cylinders only on account of the lessened heat loss to the water jackets.

It will be observed that the group control above described consists not merely in cutting off a cylinder or any number of cylinders but that it involves the arrangement of the cylinders in groups each of which has its cranks arranged so that the cylinders of that group alone will develop substantially constant torque, and running the whole number of cylinders merely increases the total power output.

When running at very light loads with

"quality governing" as above described the mixture may become too weak to ignite with certainty even in a scavenged cylinder with constant high compression. In this contingency I use an auxiliary air shutter 77 for one or more of the crank case compartments as shown in Fig. 8. The shutter 77 is mounted on a pivot 78 supported on a cover 79 secured to the cover 17 outside the screen 18. The cover 79 is provided with radial ports 80 and the shutter 77 is provided with similar ports 81.

A rod 82 controls one or more shutters 77 and may be independently operated, but is preferably connected to the rod 84 operating the gas throttle valves 52 and 53, in such a manner that it does not operate until the throttle 52 has been closed or the throttle 53 moved to a position corresponding to about one-quarter load on the engine. The shutters 77 are normally held open by springs 83. The gas valves 52 and 53 may also be operated independently but the preferred arrangement is shown diagrammatically in Fig. 9, in which the valves 52 and 53 are assumed to be fully open and are closed consecutively as follows: The lever 96 operates a link 84 which controls the front cylinders through the gas valve 52. A second link 85 is connected to link 84 and is provided with a slot 86 which, when the valve 52 is fully closed, engages a pin 87 on the lever 88 of valve 53 to close it. When lever 96 is moved further to the right and has closed valve 53 to a point corresponding to about one-quarter load, a lug 89 on link 84 strikes the end of lever 90 which operates the link 82 to close the air shutters 77 on the rear crank cases. Thus after entirely shutting off the gas from the front cylinders by closing valve 52, and partially reducing the gas supply to the rear cylinders by partly closing valve 53, the air shutters 77 are partially closed to reduce the flow of air into the rear crank cases (and cylinders) thus preventing the mixture in these cylinders from becoming too weak to ignite at loads less than about one-quarter load.

When increasing the power, a movement of the lever 96 to the left admits more gas through valve 53 and more air through shutters 77 until quarter load is reached when shutters 77 are fully opened. After this still more gas is admitted until the rear cylinders are working at full power (one-half load of engine) with valve 53 wide open and valve 52 still closed. A further demand for power results in the rear cylinders working at full power and additional power being furnished by the front cylinders until all the cylinders are working at full power with valves 52 and 53 both fully open.

By this arrangement, all loads are carried in the manner desired and the motor is fully controlled by a single lever over its entire range of power. It is obvious that the lever 96 might be operated by a governor and the control made automatic. It will also be apparent that either the front or rear group of cylinders may be arranged to carry the zero to half loads.

My improved engine is very economical of fuel for the following reasons:

1st. The cylinders are completely scavenged at each stroke by pure air.

2nd. Substantially constant compression is maintained at all loads except light loads because the air charge is uniform.

3rd. By reason of the pure charge and high compression weaker mixtures can be used which are more efficient.

4th. By controlling the cylinders in groups the gas is burnt in only enough cylinders to carry the load thus making the capacity of the engine in a sense adjustable to the load, it being well known that engines of this type use from 20% to 50% more fuel per unit of power developed at half load than at full load and usually more than twice as much fuel at quarter load as at full load.

5th. No gas can possibly be lost through the exhaust ports before combustion takes place.

What I claim is:

1. In an internal combustion engine, a plurality of cylinders, a piston and an independent closed crank case for each cylinder, separate air inlet and discharge valves for each of said crank cases, a manifold connecting the discharge valves from all of said crank cases, means for distributing the air pumped in all the crank cases to the several cylinders, and separate means for supplying fuel to the cylinders.

2. In an internal combustion engine, a plurality of cylinders, a piston and a closed crank case for each cylinder, air inlet and discharge valves for each of said crank cases, a manifold connecting the discharge valves from all of said crank cases, means for distributing the air pumped in all the crank cases to the several cylinders, means for heating the air to expand the same on its way to the cylinders, and separate means for supplying fuel to the cylinders.

3. In an internal combustion engine, a plurality of cylinders, a piston and a closed crank case for each cylinder, a manifold receiving the fluid discharge from the crank cases, and means for heating the fluid passing through said manifold by the exhaust from the cylinders.

4. In an internal combustion engine, a plurality of cylinders, a piston and a closed crank case for each cylinder, a manifold receiving the fluid discharge from said crank cases, a valve for distributing said fluid to said cylinders, and a connection between said manifold and said valve.

5. In an internal combustion engine, a plurality of power cylinders, a gas pump for each cylinder, inlet valves for the gas pumps, discharge valves for the gas pumps, a gas reservoir common to all the cylinders, and a hollow rotary valve between the reservoir and the cylinders having its interior space successively in communication with a plurality of cylinders to supply them with gas.

6. In an internal combustion engine, a plurality of cylinders, a gas pump for each cylinder, separate means for pumping air, a gas pressure manifold receiving the gas from all the gas pumps and acting as a storage reservoir for gas under pressure, means for maintaining a constant pressure above atmospheric pressure in said manifold, and means connecting the reservoir with the upper ends of the cylinders.

7. In an internal combustion engine, a plurality of cylinders, a gas pump for each cylinder, a gas supply pipe common to all the gas pumps, a gas pressure pipe common to all the gas pumps, a by-pass connecting the supply and pressure pipes, and a pressure regulating valve in the by-pass for maintaining a constant pressure in the pressure pipe.

8. In an internal combustion engine, a two diameter cylinder, a two diameter piston therein, means for compressing a charge of scavenging air on the down stroke of the piston, means for compressing a charge of gas on the up stroke of the piston, a rotary valve controlling the admission of the air and the gas to the cylinder, an exhaust port uncovered by the piston, and means for driving the valve in such relation to the piston travel that the air is admitted while the exhaust port is opened and the gas is admitted after the exhaust port is closed.

9. In an internal combustion engine, a plurality of cylinders, a piston for each cylinder, and exhaust ports for each cylinder, a rotary valve common to all of said cylinders, means for supplying air under pressure to said valve at a central point thereof, and means for supplying gas under pressure to the ends of the valve.

10. In an internal combustion engine, a plurality of cylinders, a piston and closed crank cases for each cylinder, a discharge valve for each crank case, said valves being located in a common chamber, and a detachable cover for said chamber.

11. In an internal combustion engine, a cylinder, a piston, an inlet port to said cylinder, and a rotary valve controlling the admission of fluid through said port, said valve having two compartments, one for air and one for gas, and a port leading from each of said compartments to the inlet ports.

12. In an internal combustion engine, a cylinder having a wedge-shaped combustion space with the small end of the wedge away from the cylinder bore, a long narrow inlet port at the small end of the wedge, and a pair of deflectors for distributing the flow of the gas from said port into the cylinder.

13. In an internal combustion engine, a plurality of cylinders, a crank shaft, air compressing means for each cylinder, gas compressing means for each cylinder, a rotary valve extending along the tops of the cylinders, parallel to the shaft for successively admitting the air and gas to the cylinders in the order named, means for conveying the compressed air to said valve and means for conveying the compressed gas thereto.

14. In an internal combustion engine, a plurality of cylinders, water jackets for the same, a gas pump, a gas reservoir between the gas pump and the cylinders, said reservoir having a capacity exceeding a single charge for the cylinders, a water jacket on said reservoir separate from said cylinder jackets, and a connection from the discharge of each of the cylinder jackets to said water jacket, whereby the gas under pressure in the reservoir is held there for a certain time and heated by the hot water coming from the cylinder jackets.

15. In an internal combustion engine, a cylinder, a water jacket therefor, a piston, a gas pump, a gas reservoir connected to said cylinder and to said pump, a jacket on said reservoir separate from said cylinder jacket, and a connection between the cylinder jacket and the reservoir jacket whereby hot water can be supplied to the latter to heat the compressed gas in the reservoir.

16. In an internal combustion engine, a cylinder, a hollow rotary valve, an air reservoir within said valve, means for supplying said reservoir with air under pressure, a gas reservoir within said valve, means for supplying the same with gas under pressure, a port leading into the cylinder, and ports in the valve for successively connecting the air and gas reservoirs with the cylinder.

17. In an internal combustion engine, a cylinder, a piston, a closed crank case, a passage leading from the crank case to the cylinder through which substantially equal charges of air are normally pumped to the cylinder at each down stroke of the piston, a supply of gas under pressure, means for introducing said gas into the cylinder, and means for throttling the gas and simultaneously reducing the air supply to the cylinder under less than normal loads.

18. In an internal combustion engine, a cylinder, a piston, a closed crank case, an air inlet therefor, a passage leading from the crank case to the cylinder through which substantially equal charges of air are normally pumped to the cylinder at each down stroke of the piston, a gas pump, a pipe leading from the gas pump to the cylinder, a throttle valve in said pipe, a throttle controlling the air inlet to the crank case, means for operating the gas throttle independently of the air throttle, and means for operating both together.

19. In an internal combustion engine, an even number of cylinders connected to a common crank shaft, fuel supply means, a gas supply pipe connected to said fuel supply means and supplying one half of the cylinders, a second gas supply pipe connected to said fuel supply means and supplying the other half of the cylinders, a gas throttle valve in each of said supply pipes for simultaneously controlling the supply of fuel to the group of cylinders fed by such pipe, and means for operating one of said valves independently of the other.

20. In a two-cycle internal combustion engine, four cylinders arranged in two groups, the cylinders of each group having cranks at 180 degrees, and means for controlling the fuel supply to one group of cylinders independently of the other.

21. In an internal combustion engine, a number of cylinders arranged in groups, each group having a plurality of cylinders arranged to produce substantially constant torque, and a single control means for first controlling the fuel supply to one group of cylinders and then the fuel supply to the other group.

22. In an internal combustion engine, a crank shaft, a plurality of cylinders arranged in groups, each of said groups having the cranks operated by its cylinders set to produce substantially continuous torque, a single control means for first cutting off the fuel supply to the one group of cylinders then reducing the fuel supply to the other group, and for then cutting down the air supply after the fuel supply to the last group has been reduced to a predetermined point.

23. In an internal combustion engine, a crank shaft, a plurality of cylinders arranged in groups, each of said groups having the cranks operated by its cylinders set to produce substantially continuous torque, means for separately controlling the fuel supply to the different groups of cylinders, means for normally supplying the cylinders with a constant air charge and a variable gas charge, and means for simultaneously reducing the air and gas charges on less than normal loads.

24. In an internal combustion engine, a crank shaft, a plurality of cylinders arranged in groups, each of said groups having the cranks operated by its cylinders set to produce substantially continuous torque, means for separately controlling the fuel supply to the different groups of cylinders, means for normally supplying the cylinders with a constant air charge and a variable gas charge, and means operating after the gas supply has been shut off from one group of cylinders for simultaneously reducing the air and gas supply to the other group of cylinders, whereby at loads above half load all the cylinders are operated with a constant air and a variable gas charge, at loads one-fourth and below half load one group only of cylinders is operated in the same manner, and at loads less than one-fourth load one group only is operated with a variable air and a variable gas supply.

25. In an internal combustion engine, a number of cylinders arranged in groups, each group having a plurality of cylinders arranged to produce at least one power impulse for each half revolution of the crank shaft, and a single control means for first controlling the fuel supply to one group of cylinders and then controlling the fuel supply to the other group.

In testimony whereof I hereunto affix my signature in the presence of two witnesses.

WALTER W. MACFARREN.

Witnesses:
R. M. GAUGHAN,
E. B. WALTERS.